US012709391B2

(12) United States Patent
Eisenhardt et al.

(10) Patent No.: US 12,709,391 B2
(45) Date of Patent: Aug. 18, 2026

(54) ADAPTABLE LAVATORY

(71) Applicant: B/E AEROSPACE, INC., Winston Salem, NC (US)

(72) Inventors: Geoffrey L. Eisenhardt, Olathe, KS (US); Michael Princip, Winston-Salem, NC (US); Patrick Michael Quinn, Winston-Salem, NC (US); Travis John Vaninetti, Bothell, WA (US); Travis K. Finlay, Durham, NC (US); Jefferey M. McKee, Duvall, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 19/096,439

(22) Filed: Mar. 31, 2025

(65) Prior Publication Data

US 2025/0361009 A1 Nov. 27, 2025

Related U.S. Application Data

(60) Provisional application No. 63/651,834, filed on May 24, 2024.

(51) Int. Cl.
*B64D 11/00* (2006.01)

(52) U.S. Cl.
CPC .................................... *B64D 11/00* (2013.01)

(58) Field of Classification Search
CPC ... E06B 3/48; E06B 3/481; E06B 9/36; E06B 9/362; B64D 11/02; B64D 11/0023; B64C 1/1407; E05D 2015/1034; E05D 2015/1089; E05D 15/00; A47H 15/02; E04B 2/827
USPC .......................................................... 220/544
See application file for complete search history.

(56) References Cited

U.S. PATENT DOCUMENTS

| | | | | |
|---|---|---|---|---|
| 4,555,828 | A * | 12/1985 | Matimura | E04B 2/827 104/130.09 |
| 7,152,257 | B2 * | 12/2006 | Statmann | E04H 1/1216 52/64 |
| 9,045,231 | B2 | 6/2015 | Swain | |
| 9,308,997 | B2 * | 4/2016 | Scown | B64D 11/02 |
| 9,359,076 | B2 | 6/2016 | Ivester et al. | |
| 9,561,854 | B2 * | 2/2017 | Schliwa | B64D 11/04 |
| 2011/0083577 | A1 * | 4/2011 | Tilley | B66C 21/02 104/96 |
| 2014/0123571 | A1 * | 5/2014 | Swain | B64D 11/0023 29/401.1 |
| 2016/0039522 | A1 | 2/2016 | Koyama et al. | |

(Continued)

*Primary Examiner* — Joshua D Huson
*Assistant Examiner* — Anna L. Gordon
(74) *Attorney, Agent, or Firm* — SNELL & WILMER L.L.P.

(57) ABSTRACT

An adaptable lavatory for persons of reduces mobility, such as wheelchair occupants, may comprise an aircraft lavatory wall system with a center wall which is configured to translate along a drop ceiling rail system. A linear rail system may be installed within the drop ceiling and have rollers coupled to hanging brackets to secure the center wall. The center wall may be secured in a center of two individual lavatory stalls to provide for a dual lavatory configuration. The center wall may be translated forward or aft along the drop ceiling rail system and secured on either side of the lavatory to provide for an expanded lavatory space in either a right-handed or left-handed configuration.

17 Claims, 18 Drawing Sheets

(56) References Cited

U.S. PATENT DOCUMENTS

2017/0314607 A1* 11/2017 Bauer ...................... A47H 1/18
2018/0251222 A1* 9/2018 Banfield ............... E04H 1/1216
2024/0158082 A1 5/2024 Ruiz Lara et al.
2024/0167273 A1 5/2024 Worrasangasilpa et al.

* cited by examiner

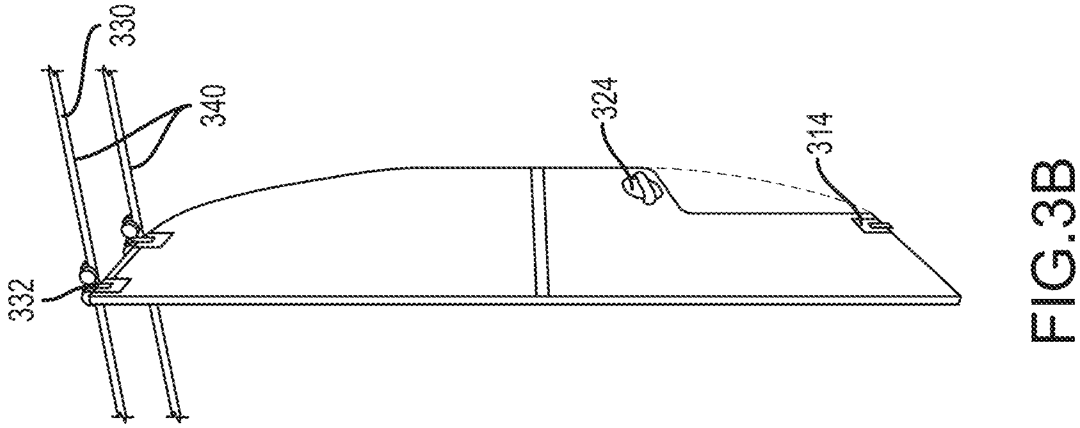
FIG.3B
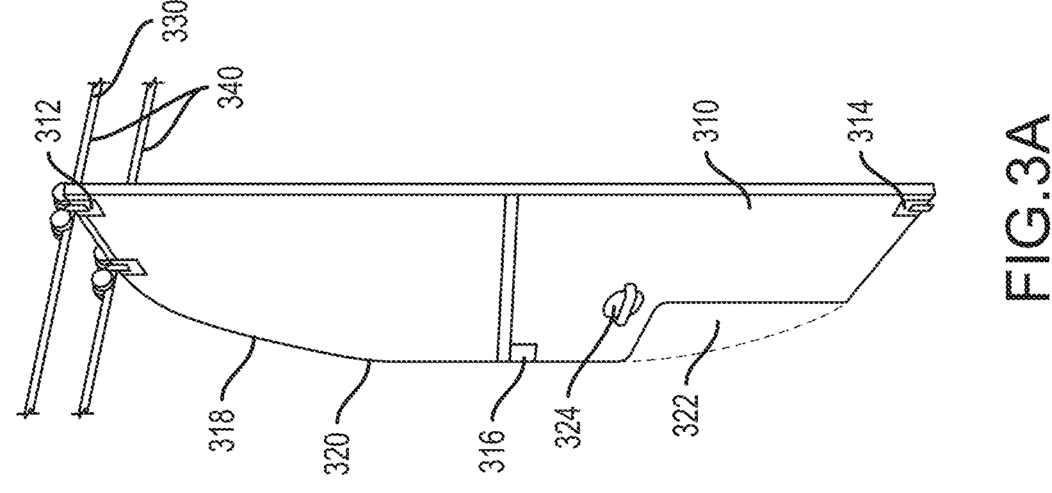
FIG.3A

ADAPTABLE LAVATORY

CROSS REFERENCE TO RELATED APPLICATIONS

This application claims the benefit and priority of U.S. Provisional Application 63/651,834, entitled "ADAPTABLE LAVATORY," filed on May 24, 2024, which is hereby incorporated by reference in its entirety herein.

FIELD

The present disclosure generally relates to lavatory systems and, more particularly, to adaptable lavatory solutions for aircraft lavatories.

BACKGROUND

Aircraft lavatories may be difficult to access for passengers who use wheelchairs or other mobility devices. Space constraints in aircraft design tend to lead to designs that may not fully account for the needs of passengers who use wheelchairs or other mobility devices. Lavatories are typically equipped with doorways measuring 19" to 21" in width, requiring some passengers to contort their bodies and sidestep through the threshold. This presents not only a greater challenge for those with mobility impairments but may also be insurmountable for some. Wheelchair users are at a particular disadvantage as they must abandon their wheelchair outside the lavatory and navigate their body through the same narrow opening, increasing the difficulty for both passengers and crew.

Current design solutions, which utilize retractable and rotating walls to convert two centerline lavatories into one, are effective but limited to lavatories located along the aircraft centerline. These lavatory configurations are optional, aircraft specific and are traditionally located in the aft complex of the airframe. A vast majority of lavatories are located outboard, adjacent to aircraft sidewalls. The significant curvature of outboard lavatories precludes the use of retractable walls as there is little to no space for storage and a rotating wall would collide with the curved outboard wall. Unlike centerline lavatories which lack such curvature and can accommodate hinged dividing walls, outboard lavatories necessitate a different approach.

The adaptable lavatory would allow for greater convenience, comfort, and accessibility for passengers using wheelchairs, especially those who require assistance in transferring from the wheelchair. The adaptable lavatory may also allow for compliance with aviation regulations and allow for converting between a single and a double lavatory to support high-traffic needs.

SUMMARY

According to various embodiments, a lavatory wall system is disclosed. In various embodiments, the lavatory wall system comprises a pair of rail tracks. In various embodiments, the lavatory wall system comprises a pair of hanging brackets coupled to the rail tracks via rollers disposed and configured to translate within the rail tracks. In various embodiments, the lavatory wall system comprises a center wall coupled to the hanging brackets and configured to translate with the rollers.

In various embodiments, the center wall of the lavatory wall system has a curved segment abutting a cutout and a flat segment opposing the curved segment and perpendicular to the rail tracks.

In various embodiments, the hanging brackets of the lavatory wall system are coupled to the center wall by bracket panel. In various embodiments, the hanging brackets further comprise a pivot point disposed between the rollers and the bracket panels. In various embodiments, the pivot point allows the bracket panels to rotate about an axis perpendicular to the rail tracks.

In various embodiments, the hanging brackets further comprise a dampening mechanism configured to limit the rotation of the pivot point to 20°.

In various embodiments, the drop ceiling has linear recesses configured to receive the pair of rail tracks.

According to various embodiments, an airplane lavatory is disclosed. In various embodiments, the airplane lavatory comprises a first single lavatory. In various embodiments, the airplane lavatory comprises a second single lavatory. In various embodiments, the airplane lavatory comprises a drop ceiling spanning the first single lavatory and the second single lavatory. In various embodiments, the airplane lavatory comprises a pair of rail tracks disposed within the drop ceiling. In various embodiments, the airplane lavatory comprises a pair of hanging brackets coupled to the rail tracks via rollers disposed and configured to translate within the rail tracks. In various embodiments, the airplane lavatory comprises a center wall coupled to the hanging brackets and configured to translate with the rollers.

In various embodiments, the hanging brackets are coupled to the center wall by bracket panels. In various embodiments, the hanging brackets further comprise a pivot point disposed between the rollers and the bracket panels. In various embodiments, the pivot point allows the bracket panels to rotate about an axis perpendicular to the rail tracks.

In various embodiments, the hanging brackets further comprise a dampening mechanism configured to limit the rotation of the pivot point to 20°.

In various embodiments, the drop ceiling has linear recesses configured to receive the pair of rail tracks.

In various embodiments, the center wall has at least one lock configured to prevent the center wall from translating within the rail tracks.

In various embodiments, in response to being in a dual lavatory configuration, the center wall is secured by the at least one lock in a center of the first single lavatory and the second single lavatory.

In various embodiments, in response to being in a single lavatory configuration, the center wall is translated along the rail tracks and secured by the at least one lock within at least one of the first single lavatory or the second single lavatory.

In various embodiments, the center wall has a rear wall defined by a curved segment and a cutout.

In various embodiments, the airplane lavatory comprises the cutout is configured to accommodate a toilet of at least one of first single lavatory and second single lavatory in response to the translation of center wall.

According to various embodiments, an aircraft is disclosed. In various embodiments, the aircraft comprises an adaptable lavatory including a first single lavatory, a second single lavatory, a drop ceiling spanning the first single lavatory and the second single lavatory; and a pair of rail tracks disposed within the drop ceiling. In various embodiments, the aircraft comprises a pair of hanging brackets coupled to the rail tracks via rollers disposed and configured to translate within the rail tracks. In various embodiments, the aircraft comprises a center wall coupled to the hanging brackets and configured to translate with the rollers.

In various embodiments, the hanging brackets are coupled to the center wall by bracket panels. In various embodiments, the hanging brackets further comprise a pivot point disposed between the rollers and the bracket panels. In various embodiments, the pivot point allows the bracket panels to rotate about an axis perpendicular to the rail tracks. In various embodiments, the hanging brackets further comprise a dampening mechanism configured to limit the rotation of the pivot point to 20°.

In various embodiments, the center wall has at least one lock configured to prevent the center wall from translating with respect to the rail tracks.

In various embodiments, in response to being in a dual lavatory configuration, the center wall is secured by the at least one lock in a center of the first single lavatory and the second single lavatory.

In various embodiments, in response to being in a single lavatory configuration, the center wall is translated along the rail tracks and secured by the at least one lock within at least one of the first single lavatory or the second single lavatory.

In various embodiments, the center wall has a rear wall defined by a curved segment and a cutout. In various embodiments, the cutout is configured to accommodate a toilet of at least one of first single lavatory and second single lavatory in response to the translation of center wall.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 3A illustrates a lavatory wall system, in accordance with various embodiments.

FIG. 3B illustrates a rail system of a lavatory wall system, in accordance with various embodiments.

DETAILED DESCRIPTION

Figure 1A:
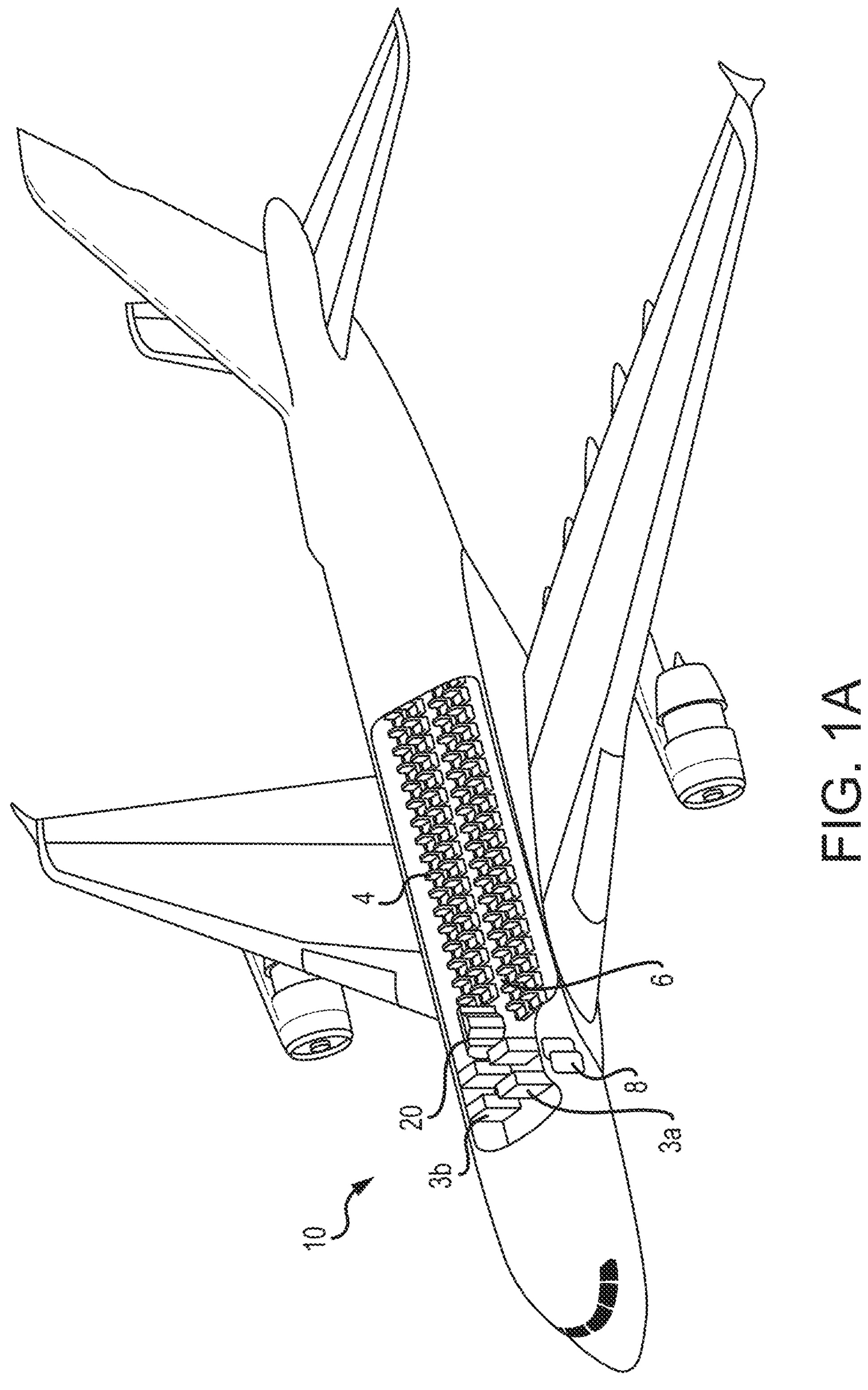
FIG. 1A illustrates an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein "rear" refers to the direction of the lavatory opposing the lavatory doors (e.g. toward the fuselage wall). As used herein "front" refers to the direction of the lavatory facing the lavatory doors (e.g. toward the lavatory entrance).

Access to commercial aircraft lavatories pose a significant challenge for individuals with reduced mobility, a situation exacerbated by spatial constraints. Lavatories are typically equipped with doorways measuring 19" to 21" in width, requiring some passengers to contort their bodies and sidestep through the threshold. This presents not only a greater challenge for those with mobility impairments but may also be insurmountable for some. Wheelchair users are at a particular disadvantage. In various embodiments, the adaptable lavatory and the lavatory wall system is beneficial for passengers traveling in wheelchairs. Various embodiments of the present disclosure address the spatial limitations of adjacent lavatories installed in the forward or aft position along the outboard wall of the aircraft. Such lavatories are traditionally separated by fixed walls, confining the space to a single unit. Various embodiments of the present disclosure introduce an innovative linear rail system seamlessly integrated into the lavatory drop ceiling. This system, in various embodiments, enables the dividing wall to translate from the center position to either the forward or aft of the lavatory, transforming two individual lavatories into one spacious unit suitable for persons with reduced mobility. The versatility of this design supports a greater variety of aircraft configurations, allowing for the selection of dual slab doors.

Disclosed herein is an adaptable lavatory and a lavatory wall system designed for use by persons of reduced mobility. Also disclosed herein is an aircraft comprising an adaptable lavatory. The adaptable lavatory may accommodate personal mobility devices. Mobility devices may include canes, walkers, airline wheelchairs, or full-size wheelchairs.

Passengers using wheelchairs on flights may be limited to less than preferable toilet usage scenarios on long flights. These options can lead to discomfort, strain, and injuries. Passengers may be asked to use smaller wheelchairs provided by the airlines instead of their own wheelchair. Passengers may be asked to transfer from their own wheelchair into a seat. Each passenger transfer process risks injury or damage to the passenger's wheelchair. The adaptable lavatory, the lavatory wall system, and the aircraft disclosed herein may allow for the passenger to use a full-size wheelchair and undergo fewer transfer processes. The adaptable lavatory, the lavatory wall system, and the aircraft disclosed herein may provide expanded space to facilitate a safer wheelchair transfer process in the lavatory. The adaptable lavatory, the lavatory wall system, and the aircraft disclosed herein may provide expanded space in the lavatory for more privacy in the transfer process. The adaptable lavatory, the lavatory wall system, and the aircraft disclosed herein may provide for left- and right-handed installations. Left- and right-handed installations may allow access to preferred support system sides for the wheelchair transfer process in the lavatory.

Commercial aviation regulations require certain components of the aircraft to be present in order for the aircraft to take off on scheduled flights. The adaptable lavatory, the lavatory wall system, and the aircraft disclosed herein can be converted between two single stall lavatories and one expanded lavatory stall without adding or removing components of the lavatory. This is beneficial to retain all components in a ready-for-flight configuration.

Figure 1B:
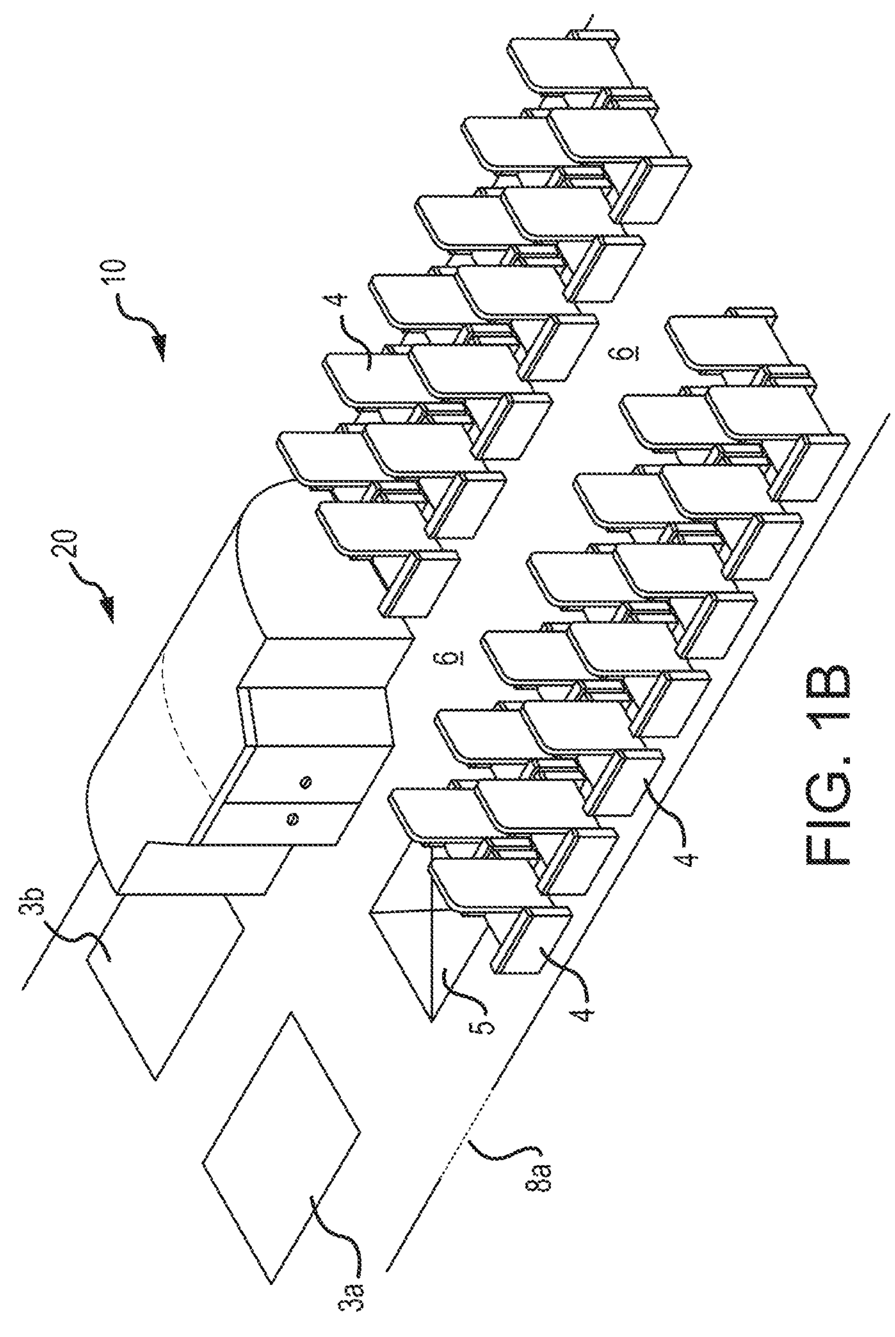
FIG. 1B illustrates an aircraft floorplan with an adaptable lavatory, in accordance with various embodiments.
Figure 1C:
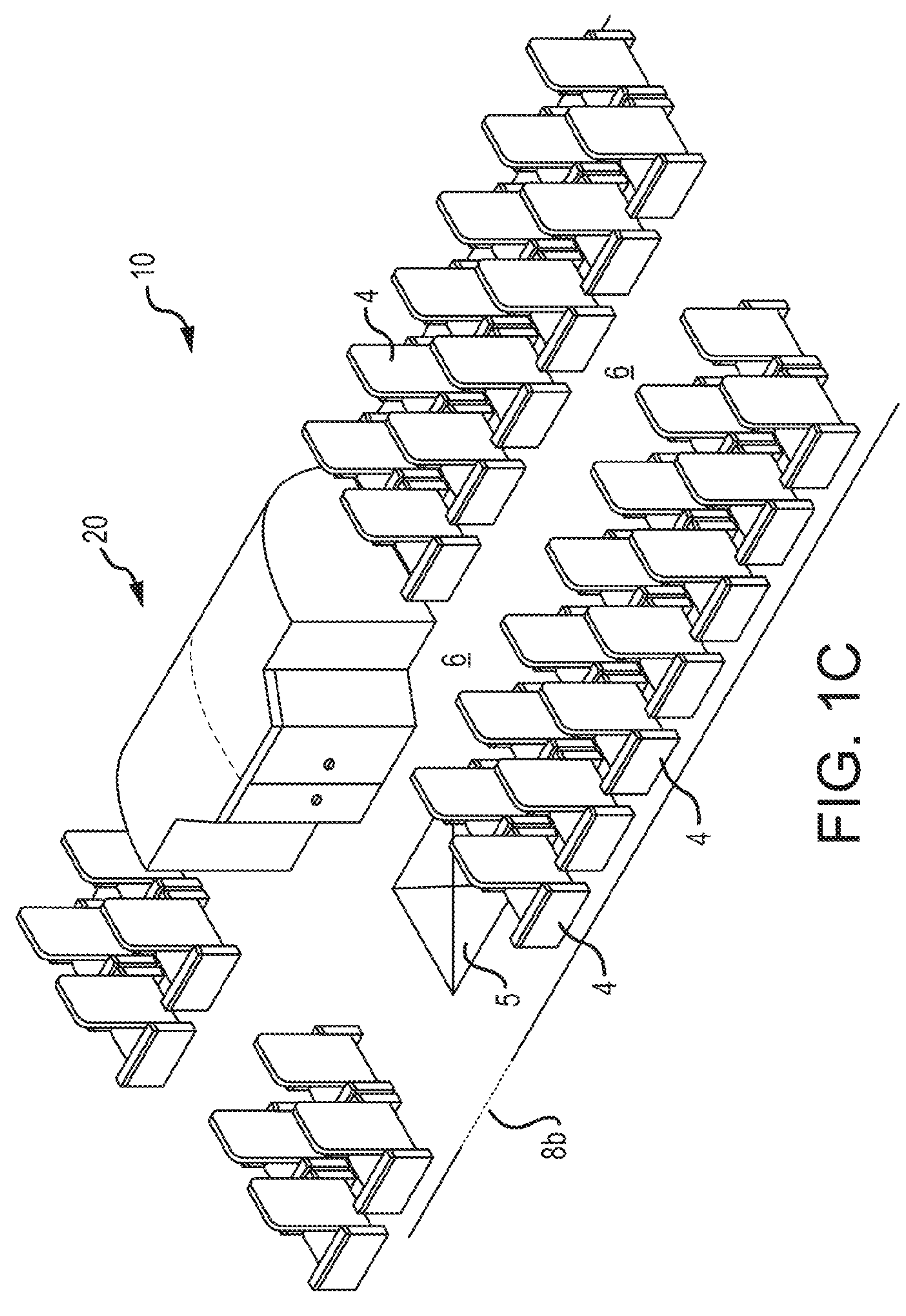
FIG. 1C illustrates an aircraft floorplan with an adaptable lavatory, in accordance with various embodiments.

With reference to FIGS. 1A-1C, an aircraft 10 is illustrated. Aircraft 10 may comprise an adaptable lavatory 20. Aircraft 10 may comprise a first galley 3*a*. Aircraft 10 may comprise a second galley 3*b*. Aircraft 10 may comprise seats 4. Aircraft 10 may comprise an aisle 6.

Aircraft 10 may comprise a wheelchair plinth 5. Aircraft 10 may comprise a main boarding door 8. The adaptable lavatory 20 may be the lavatory nearest the main boarding door 8*a*. In various embodiments, and as shown in FIG. 1B, the adaptable lavatory 20 may be aft of a first galley 3*a* and aft of a second galley 3*b*. In other embodiments, the adaptable lavatory 20 may be a forward lavatory, an aft lavatory, or a center lavatory. In other embodiments, and as shown in FIG. 1C, the adaptable lavatory 20 may be the lavatory nearest a center boarding door 8*b*, behind the wings, of an aircraft. In various embodiments, the adaptable lavatory 20 may be abutting outboard walls (i.e. curved walls) of the fuselage of aircraft 10.

Figure 2:
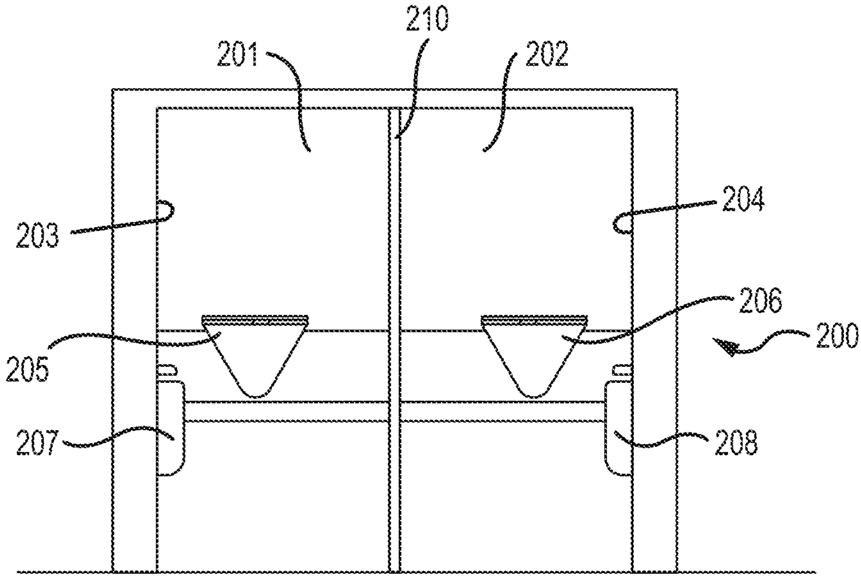
FIG. 2 illustrates an adaptable lavatory of an aircraft, in accordance with various embodiments.

With reference to FIG. 2, adaptable lavatory 200, which may be similar to adaptable lavatory 20, is illustrated. Adaptable lavatory 200 may comprise a first single lavatory 201 and a second single lavatory 202 are illustrated. The first single lavatory 201 may comprise a first wall 203. The second single lavatory 202 may comprise a second wall 204. The first single lavatory 201 may comprise a first toilet 205. The second single lavatory 202 may comprise a second toilet 206. The first single lavatory 201 may comprise a first sink 207. The second single lavatory 202 may comprise a second sink 208. In various embodiments, adaptable lavatory 200 comprises a center wall 210.

Figure 3C:
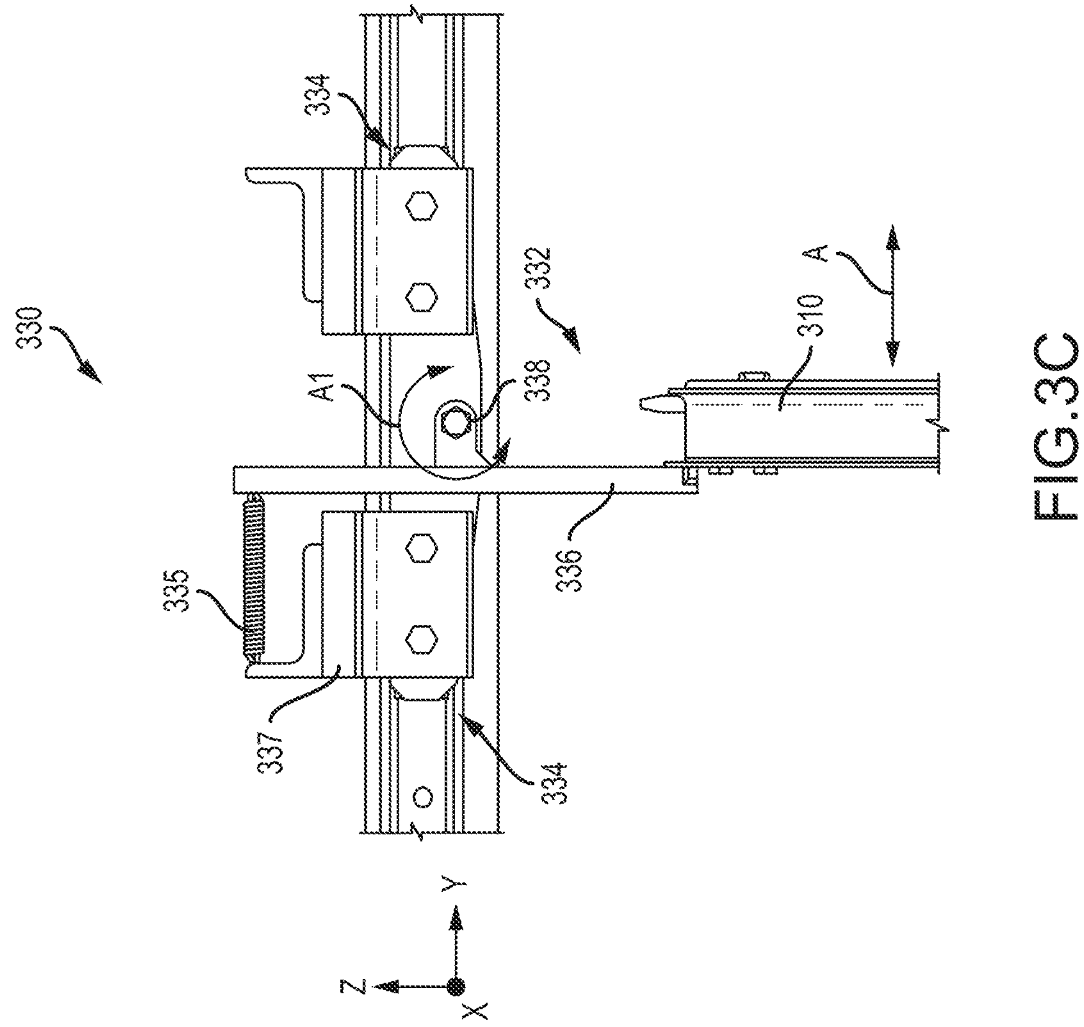
FIGS. 3C-3F illustrate a rail system of a lavatory wall system, in accordance with various embodiments.
Figure 3D:
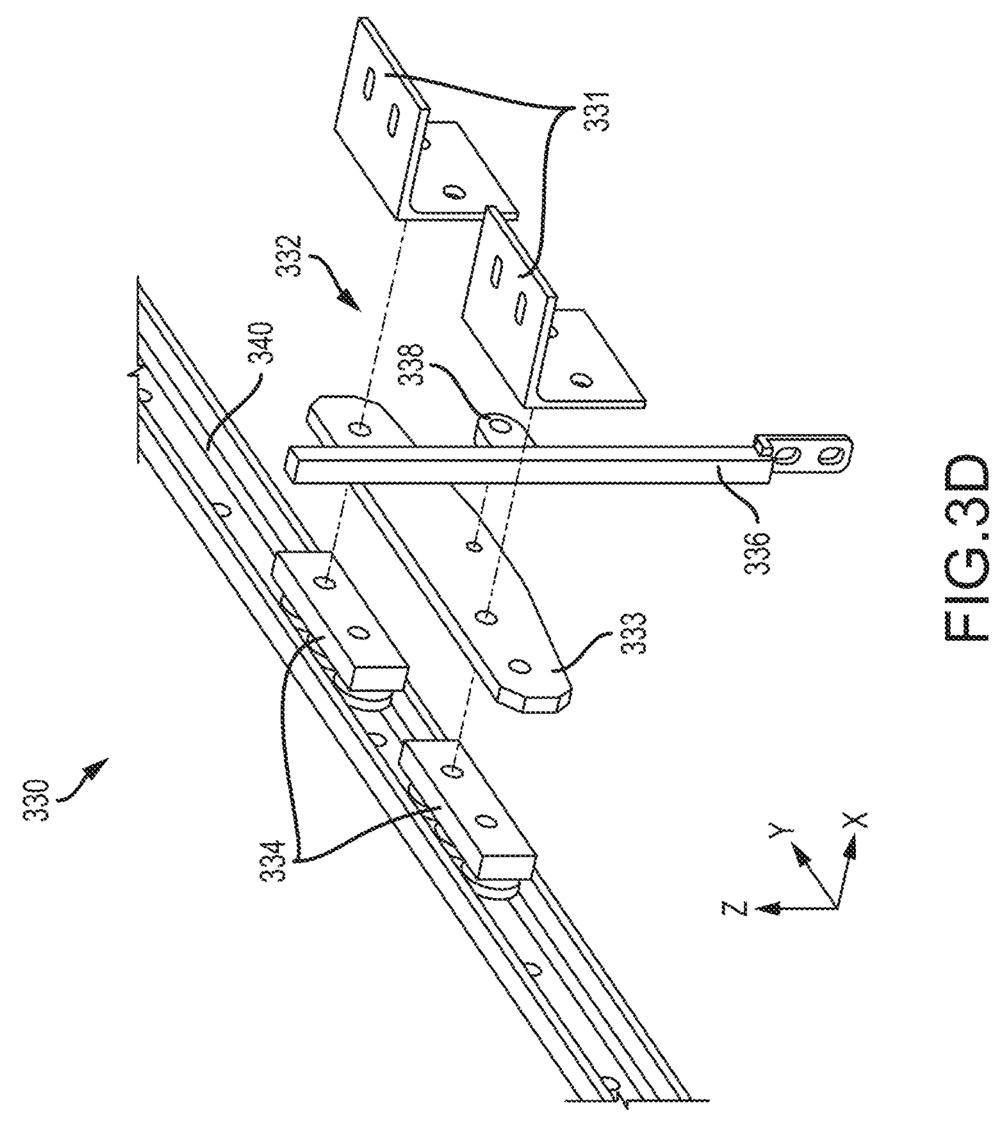

With reference to FIGS. 3A and 3B, a lavatory wall system 300 is illustrated. In various embodiments, lavatory wall system 300 comprises a center wall 310. Center wall 310 may be similar to center wall 210. Center wall 310 may comprise at least one ceiling lock 312. Center wall 310 may comprise at least one floor lock 314. Center wall 310 may comprise at least one rear lock 316. It should be understood that each of ceiling lock 312, floor lock 314, and rear lock 316 may be disposed on either face of center wall 310. Further, each face of center wall 310 may have at least one ceiling lock 312, floor lock 314, and rear lock 316. In various embodiments, a rear border of 318 of center wall 310 has a curved segment 320. In various embodiments, each of ceiling lock 312, floor lock 314, and rear lock 316 may be a mechanical latch such as a bolt, a hook and eye latch, a spring latch, a push-to-close latch, a cam latch, a magnetic latch, or any other form of securing the center wall 310.

Curved segment 320 may be configured to conform to a shape of a fuselage wall. In various embodiments, the rear border of 318 of center wall 310 has a cutout 322. Cutout 322 is a recessed portion dimensioned to be larger than a cross-section of a toilet 205, 206. In various embodiments, center wall 310 comprises a handle 324.

Figure 3E:
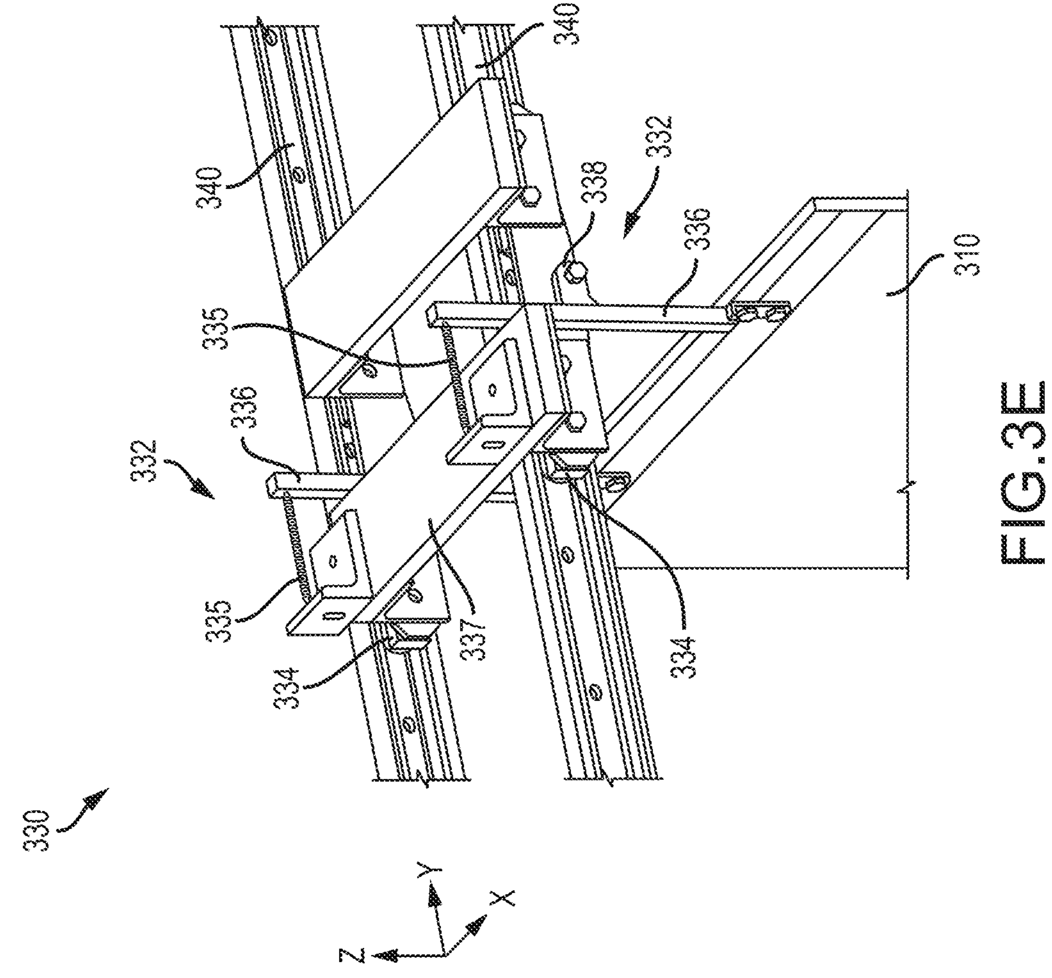

With additional reference to FIGS. 3C-3F and in various embodiments, lavatory wall system 300 comprises rail system 330. In various embodiments, rail system 330 is configured to translate center wall 310. In various embodiments, rail system 330 comprises at least one hanging brackets 332. In various embodiments, and as illustrated in FIG. 3E, rail system 330 comprises a pair of hanging brackets 332. In various embodiments, hanging brackets 332 comprise rollers 334 disposed within rail tracks 340. Rollers 334 may be configured to facilitate smooth sliding of hanging brackets 332 within rail tracks 340. In various embodiments, hanging brackets 332 comprise bracket panels 336 configured to secure a center wall 310 to the hanging brackets 332 at a lower side of bracket panels 336. Bracket panels 336 may extend above and beneath rail tracks 340. In various embodiments, hanging brackets 332 may be secured to rollers 334 via a bracket system. Bracket system may comprise a first bracket, such as elongated bracket 333 which couples hanging bracket 332 to rollers 334 disposed on either side of bracket panel 336. Bracket system may comprise a second bracket, such as an L-bracket 331. Second brackets may couple bracket panels 336 to an anti-rack device 337. Anti-rack device 337 may be coupled to rollers 334 such that anti-rack device 337 translates with rollers 334 and does not translate with respect to roller 334. In various embodiments, the rail tracks 340 and hanging brackets 332 comprise metal, polymer, wood, or any other suitable material. For example, rail tracks 340 and hanging brackets 332 may comprise aluminum.

In various embodiments, bracket panels 336 are coupled to rollers via a pivot point 338. In various embodiments, pivot point 338 allows rotation of hanging brackets 332 in a rotational direction A'. With brief reference to FIG. 3C, applying a force on center wall 310 in a lateral direction A may allow rotation of bracket panel 336 with respect to rail tracks 340 about the X-axis (where the X-axis is perpendicular to rail tracks 340). In this manner, pivot point 338 allows center wall 310 to freely swing forward and aft in a rotational direction A' during translation along rail tracks 340. Swinging in rotational direction A' may produce a cantilever force, which can then be converted into linear motion along rail tracks 340. In this manner, pivot point 338 may provide increased integrity of the rail system 330 and tend to minimize damage to hanging brackets 332.

In various embodiments, hanging brackets 332 comprise a dampening mechanism 335 coupled to bracket panel 336. Dampening mechanism 335 may be coupled to anti-rack device at an upper side of bracket panels 336. In various embodiments, dampening mechanism 335 may be a fabric pad, spring configured to compress as hanging bracket 332 pivots, a gas shock, or any other suitable damper. In various embodiments, dampening mechanism 335 limits the rotation of pivot point 338. For example, dampening mechanism 335 may limit the rotation of pivot point to 30°, to 20°, or preferably to 10°. In this manner, dampening mechanism 335 provides for smooth and controlled transfer of forces between center wall 310 and rail system 330.

Figure 3F:
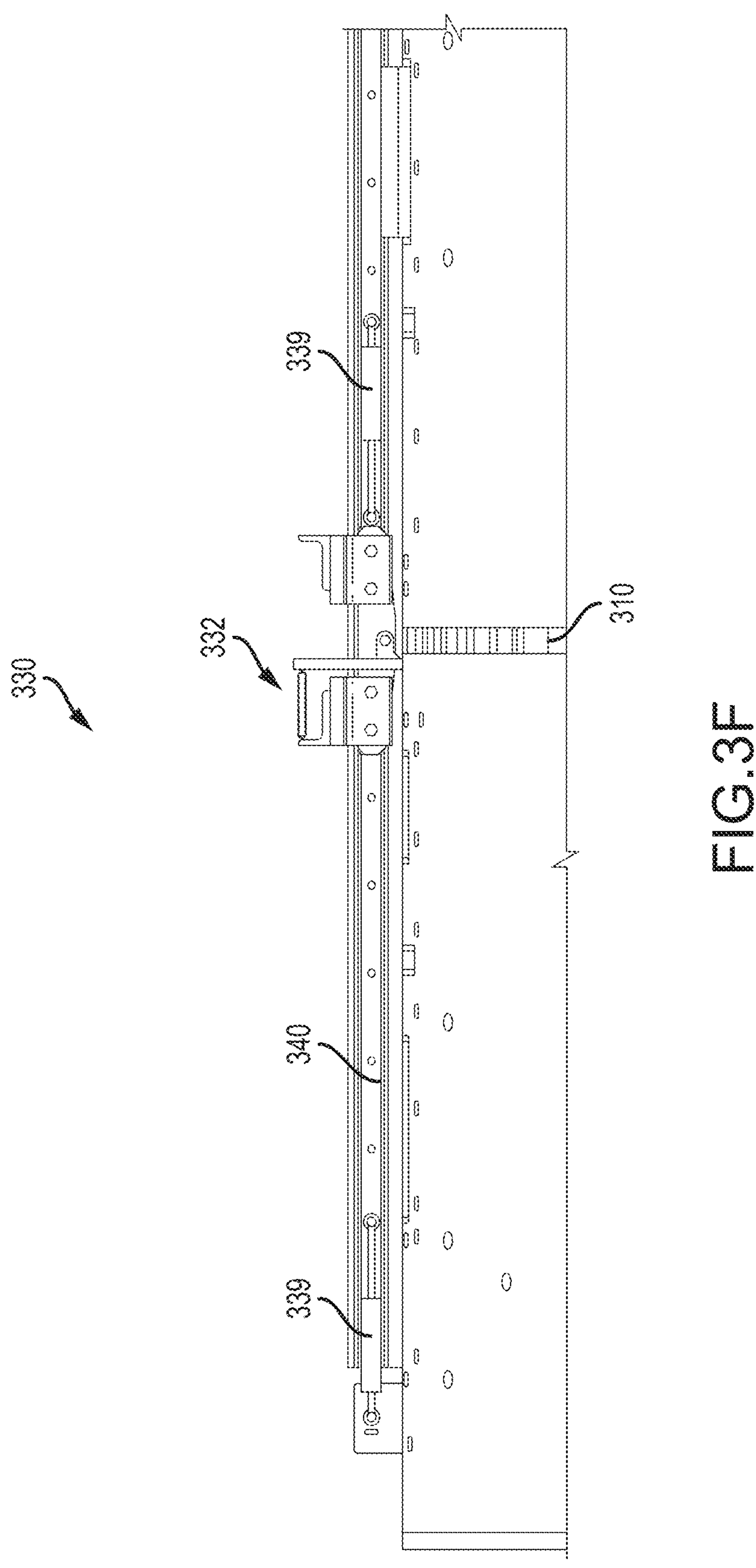

With respect to FIG. 3F, rail system 330 may comprise soft-close dampers 339. In various embodiments, rail system 330 may comprise a pair of soft-close dampers 339 such that a soft-close damper 339 is disposed on either side of rail tracks 340 with respect to center wall 310. Each soft-close damper 339 may be a fabric pad, spring configured to compress as hanging bracket 332 pivots, a gas shock, or any other damper suitable for slowing translational motion of center wall 310 near either end of rail tracks 340.

Figure 4A:
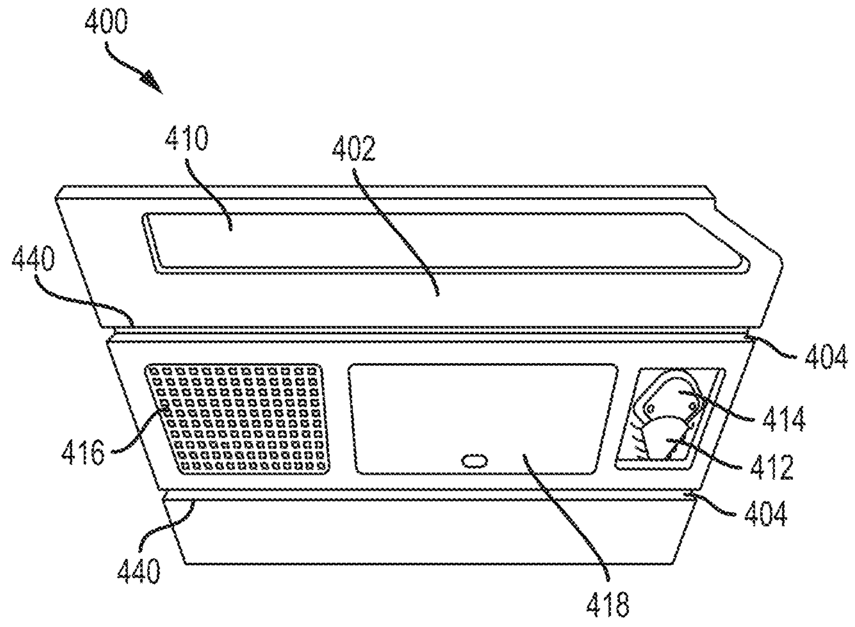
FIGS. 4A and 4B illustrates a lavatory wall system, in accordance with various embodiments
Figure 4B:
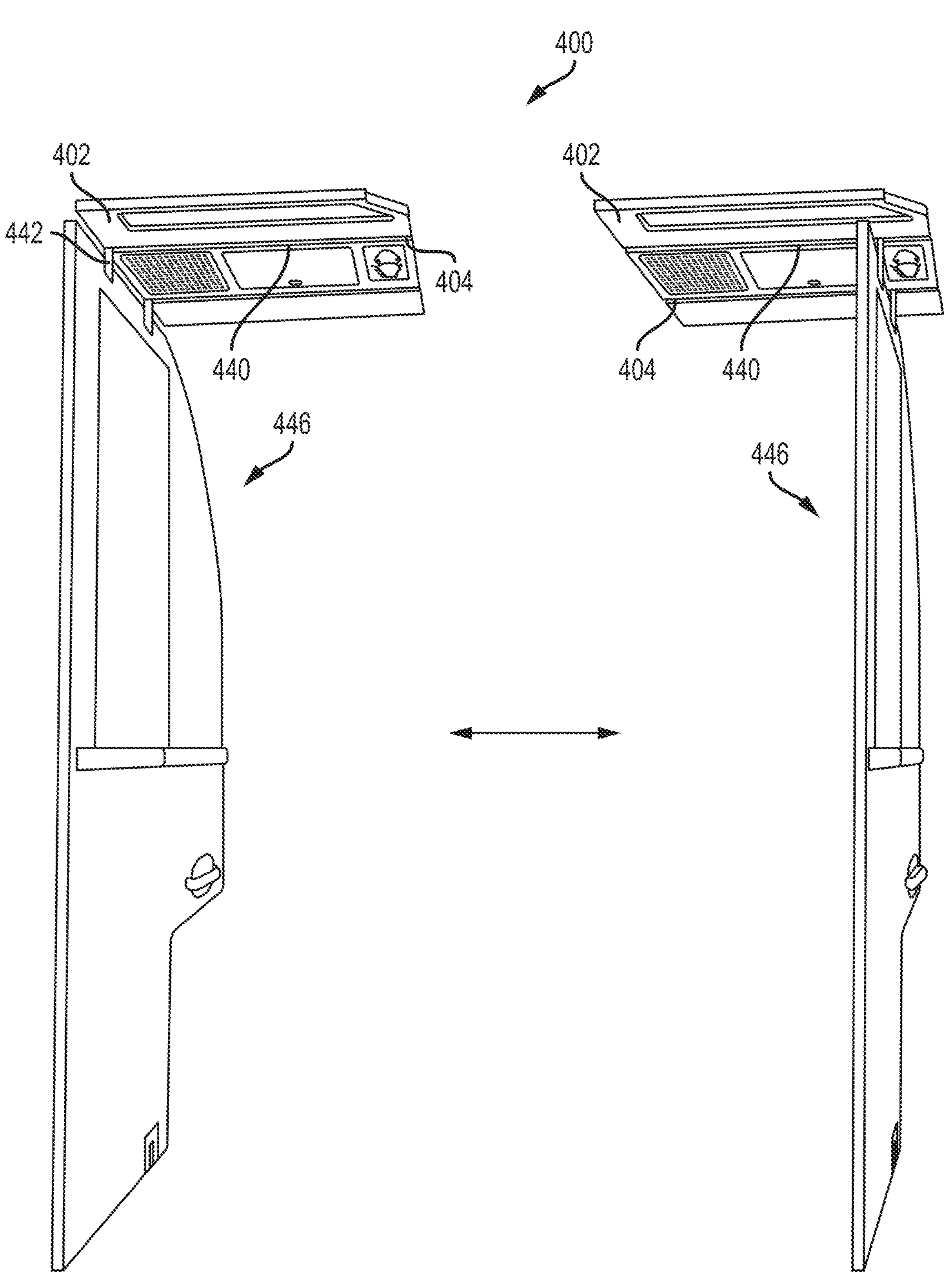

With reference to FIGS. 4A and 4B, a lavatory wall system 400 is illustrated. Lavatory wall system 400 may be similar to lavatory wall system 300. In various embodiments, lavatory wall system may comprise a drop ceiling 402. In various embodiments, drop ceiling 402 may comprise various lavatory features such as access panels 410, lights 412, status of flight indicators 414, vent 416, storage space 418, etc. It should be understood that drop ceiling 402 need not comprise all such lavatory features, may comprise additional lavatory features, and may comprise such features in alternate arrangements. In various embodiments, drop ceiling 402 may comprise linear recesses 404. In various embodiments, rail tracks 440 may be installed within linear recesses 404. In various embodiments, hanging brackets 442 may couple center wall 446 to hanging rail tracks 440 such that center wall 446 may translate along rail tracks 440 within drop ceiling 402.

Figure 5A:
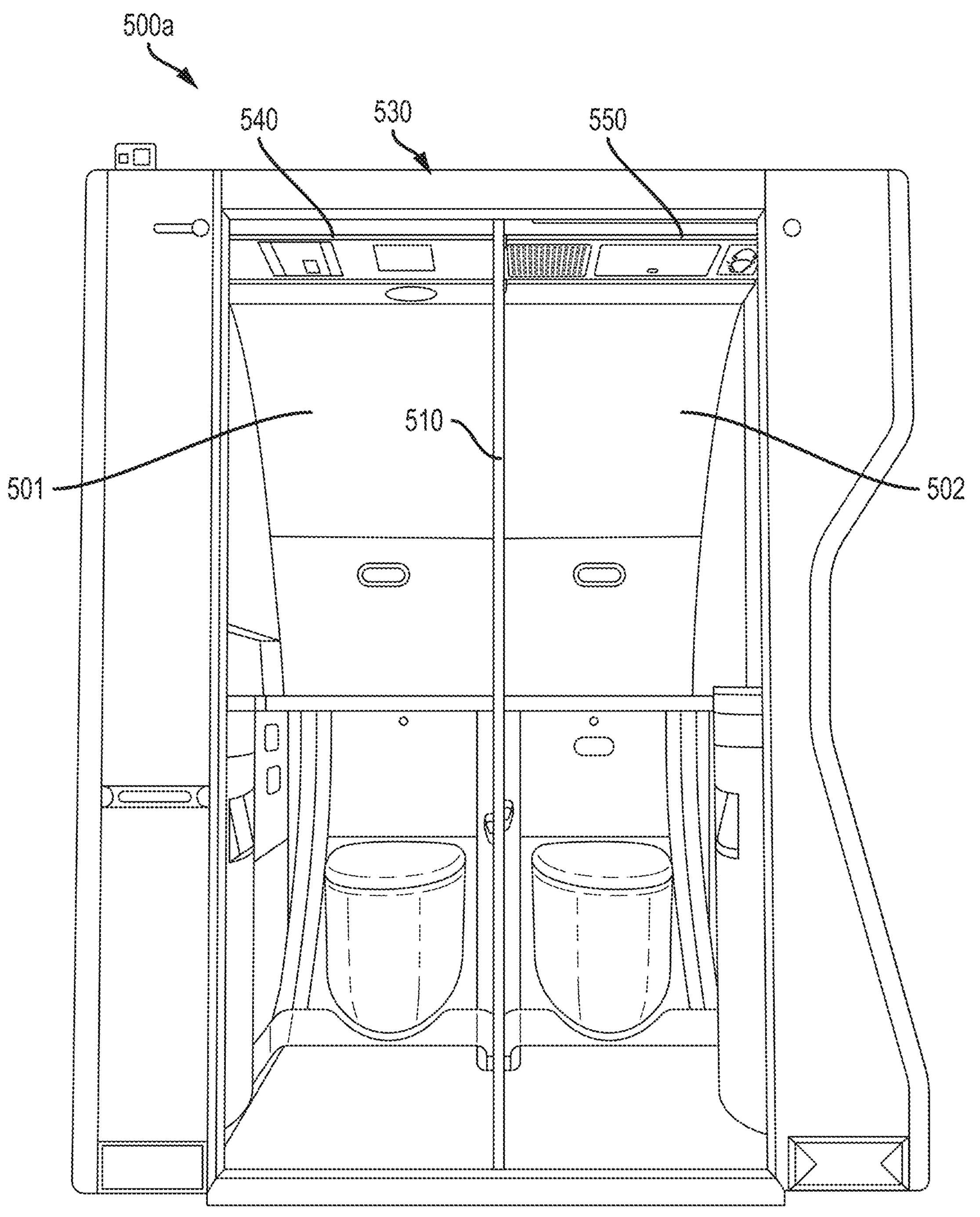
FIGS. 5A, 5B, and 5C illustrate various configurations of an adaptable lavatory, in accordance with various embodiments.
Figure 5B:
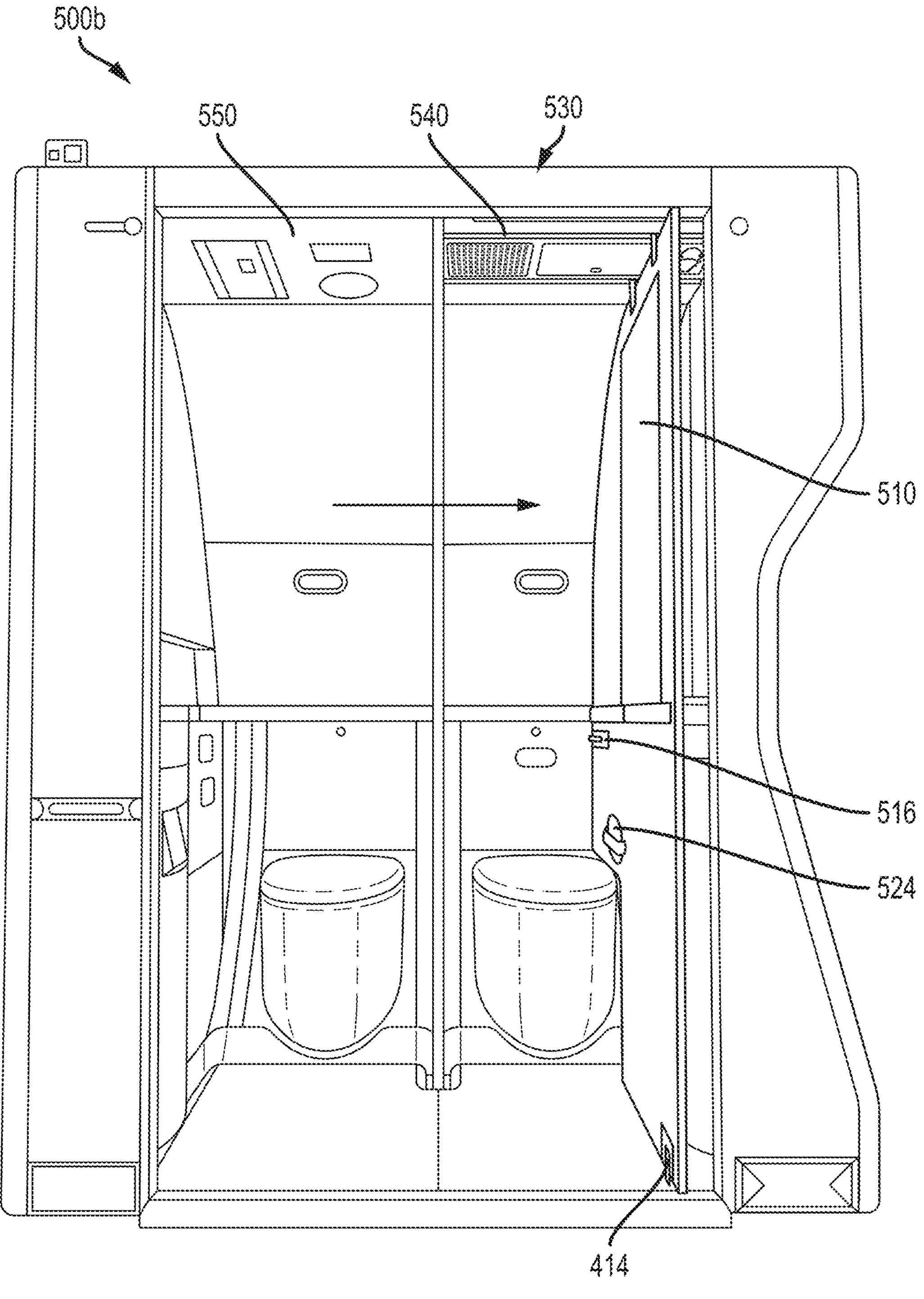
Figure 5C:
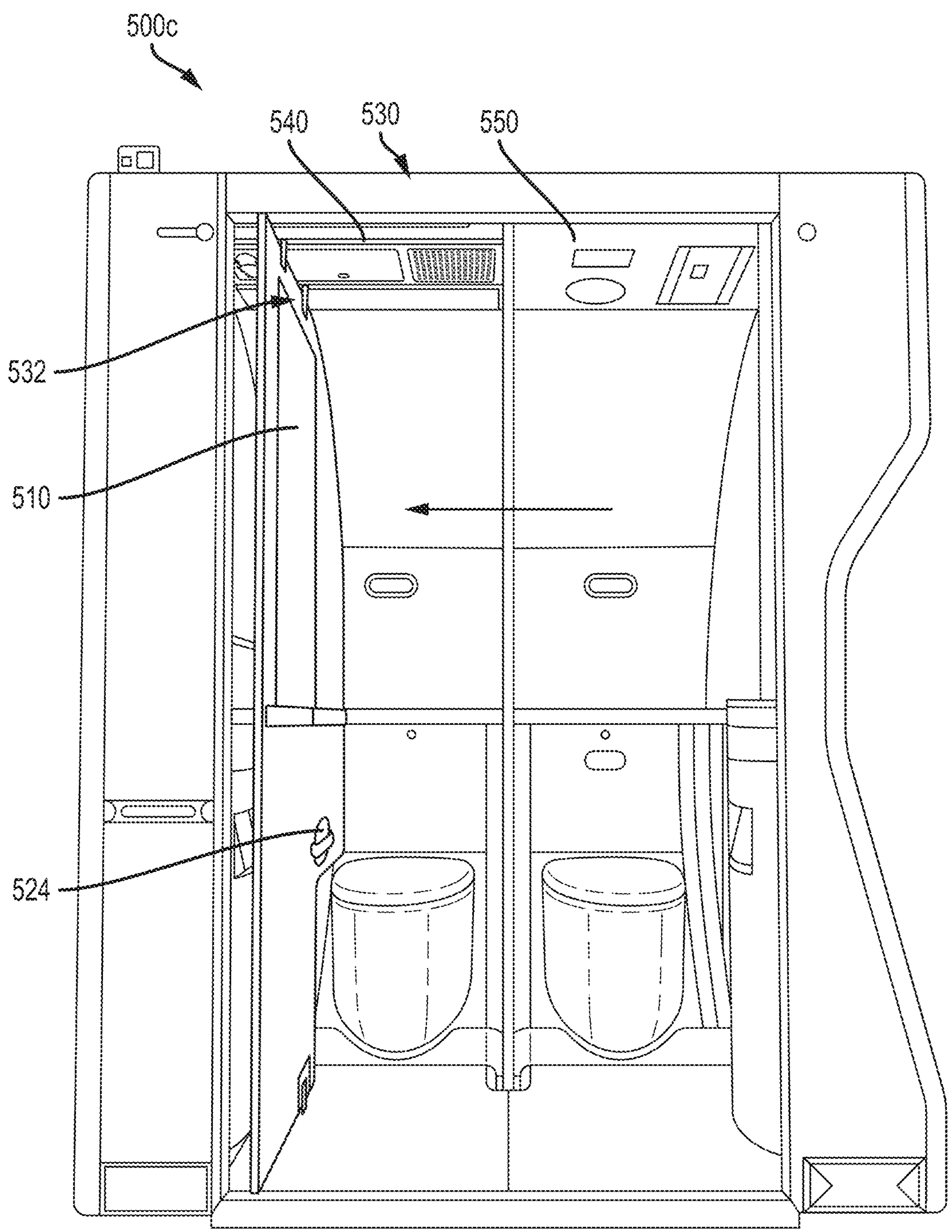

With reference to FIGS. 5A-5C, various configurations of an adaptable lavatory 500. In various configurations, adaptable lavatory comprises a first single lavatory 501 and a second single lavatory 502, similar to adaptable lavatory 200. In various embodiments, adaptable lavatory 500 may have a lavatory wall system 530. Lavatory wall system 530 may be similar to lavatory wall systems 300, 400. In various configuration, adaptable lavatory 500 comprises a drop ceiling 550, which may be similar to drop ceiling 402. In various embodiments, drop ceiling 550 may receive rail tracks 540 of lavatory wall system 530. In various embodiments, lavatory wall system 530 may comprise a center wall 510, which may be coupled to rail tracks 540 via hanging brackets 532. In various embodiments and with reference to FIG. 5A, rail tracks 540 may span the drop ceiling 550 of first single lavatory 501 and second single lavatory 502. In various embodiments and with reference to FIGS. 5B and 5C, rail tracks may span a portion of drop ceiling 550, such as, for example, on the side of first single lavatory 501, on the side of second single lavatory 502, or partial combination thereof.

With reference to FIG. 5A, adaptable lavatory 500 may have a dual lavatory configuration 500 *a*. In various embodiments, when in dual lavatory configuration 500 *a*, center wall 510 is secured centrally between first single lavatory 501 and second single lavatory 502.

In various embodiments, center wall 510 may be translated along rail tracks 540 in a forward or aft direction in order to provide a single lavatory configuration having an expanded space for occupants with reduced mobility. For example, the expanded space may be useful for passengers using wheelchairs. With reference to FIG. 5B, adaptable lavatory 500 may have a right-hand configuration 500 *b*. In various embodiments, when in right-hand configuration 500 *b*, center wall 510 is secured within second single lavatory 502. In this manner, a lavatory occupant would have access to counter space or handholds on the occupant's right side during lavatory use and transfers. With reference to FIG. 5C, adaptable lavatory 500 may have a left-hand configuration 500 *c*. In various embodiments, when in left-hand configuration 500 *c*, center wall 510 is secured within first single lavatory 501. In this manner, a lavatory occupant would have access to counter space or handholds on the occupant's left side during lavatory use and transfers.

With brief additional reference to FIG. 3A, center wall 510 may be secured by locking at least one of ceiling lock 512, floor lock 514, or rear lock 516. In various embodiments, center wall 510 may be secured centrally by locking each of ceiling lock 512, floor lock 514, and rear lock 516. It should be understood that each of ceiling lock 512, floor lock 514, and rear lock 516 may be disposed on either face of center wall 510. Further, each face of center wall 510 may have at least one ceiling lock 512, floor lock 514, and rear lock 516. In various embodiments, each of ceiling lock 512, floor lock 514, and rear lock 516 may be a mechanical latch such as a bolt, a hook and eye latch, a spring latch, a push-to-close latch, a cam latch, a magnetic latch, or any other form of securing the center wall 510.

Figure 6A:
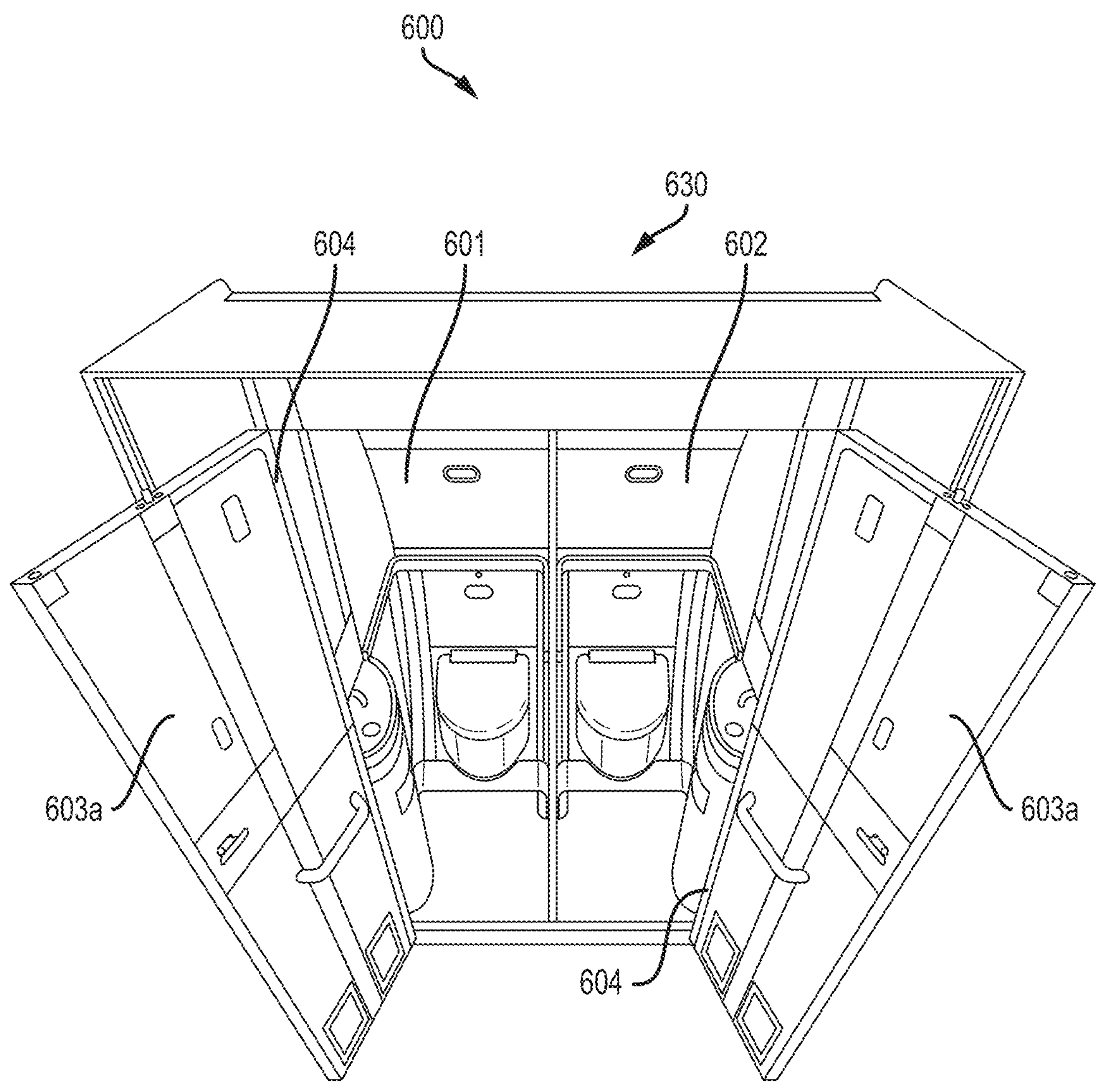
FIGS. 6A, 6B, and 6C illustrates various door configurations of an adaptable lavatory, in accordance with various embodiments.
Figure 6B:
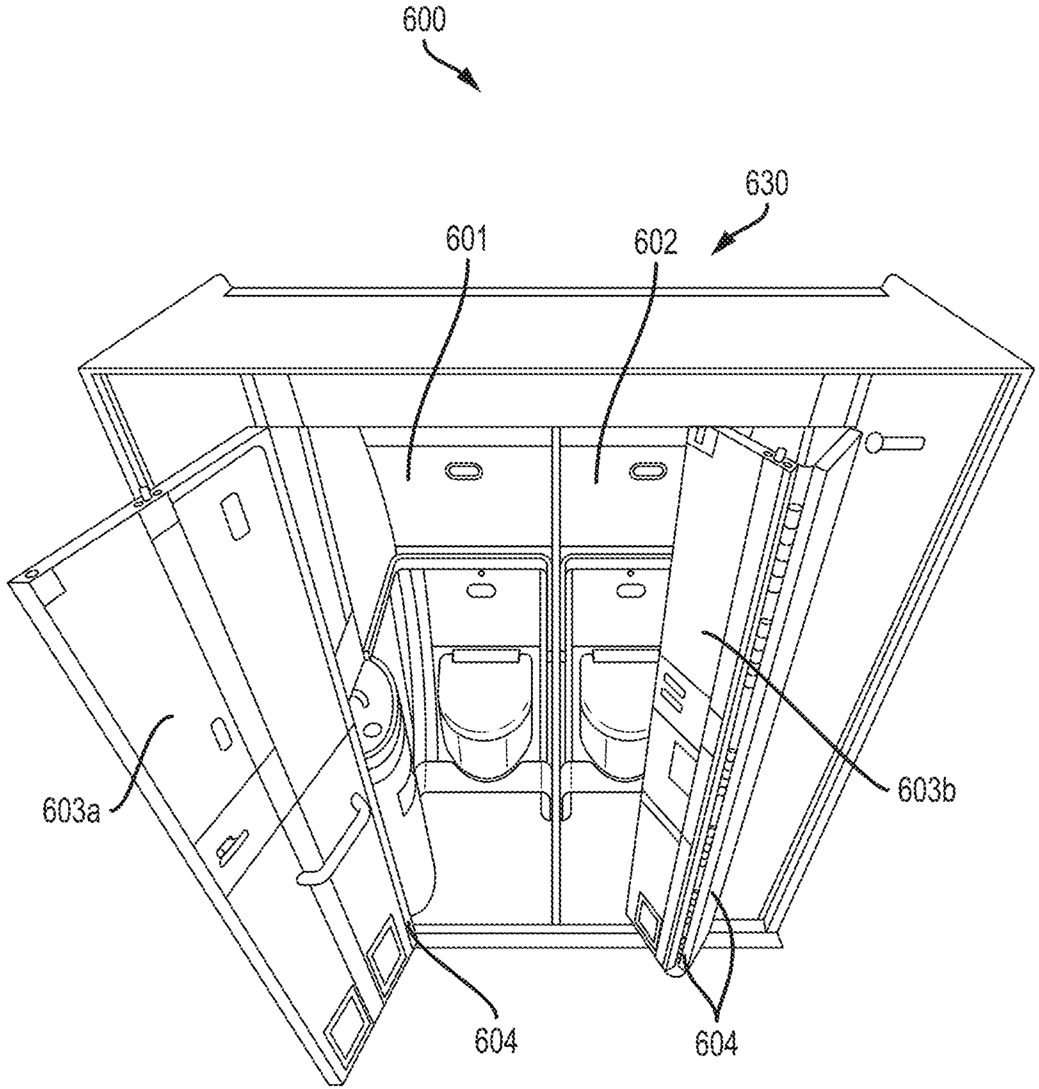
Figure 6C:
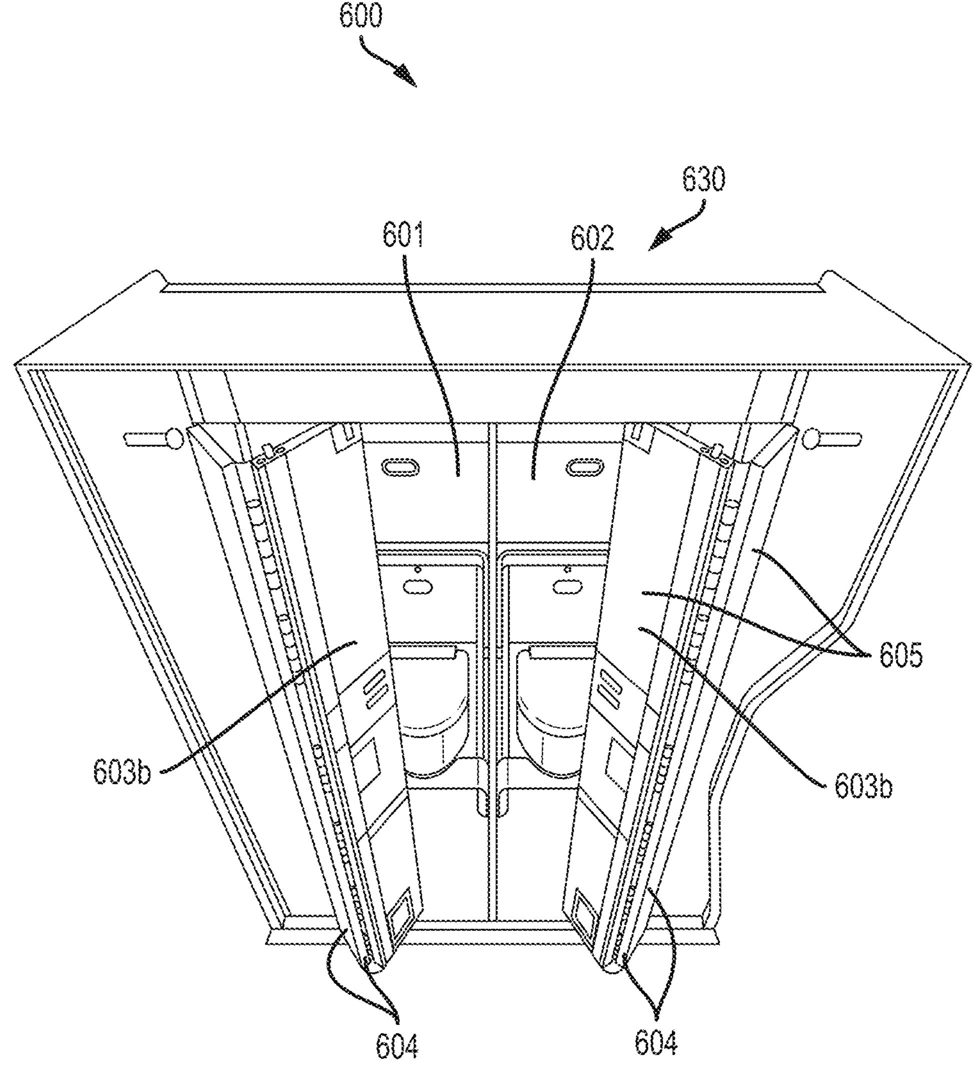

With reference to FIGS. 6A-6C, an adaptable lavatory 600 is illustrated. Adaptable lavatory 600 may be similar to adaptable lavatory 500. Adaptable lavatory 600 may comprise a first single lavatory 601 and a second single lavatory 602, similar to adaptable lavatories 200, 500. Adaptable lavatory 600 may comprise a door 603 for each of first single lavatory 601 and second single lavatory 602. Doors 603 may operate independently of each other such that adaptable lavatory 600 may be used by two occupants independently when in a dual lavatory configuration. In various embodiments, and as shown in FIG. 6A, doors 603 may be fixed panel doors 603 *a*, which may comprise a single hinge 604 coupling fixed panel door 603 *a* to adaptable lavatory 600. In various embodiments, and as shown in FIG. 6C, doors 603 may be bi-fold doors 603 *b*, which may comprise two hinges 604, one coupling bi-fold door 603 *b* to adaptable lavatory 600 and one allowing the panels 605 of bi-fold door 603 *b* to fold. In various embodiments, and as shown in FIG. 6B, adaptable lavatory 600 may comprise one each of a fixed panel door 603 *a* and a bi-fold door 603 *b*. It should be understood that the embodiment of FIG. 6B could have either relative configuration of fixed panel door 603 *a* and bi-fold door 603 *b*.

Figure 7:
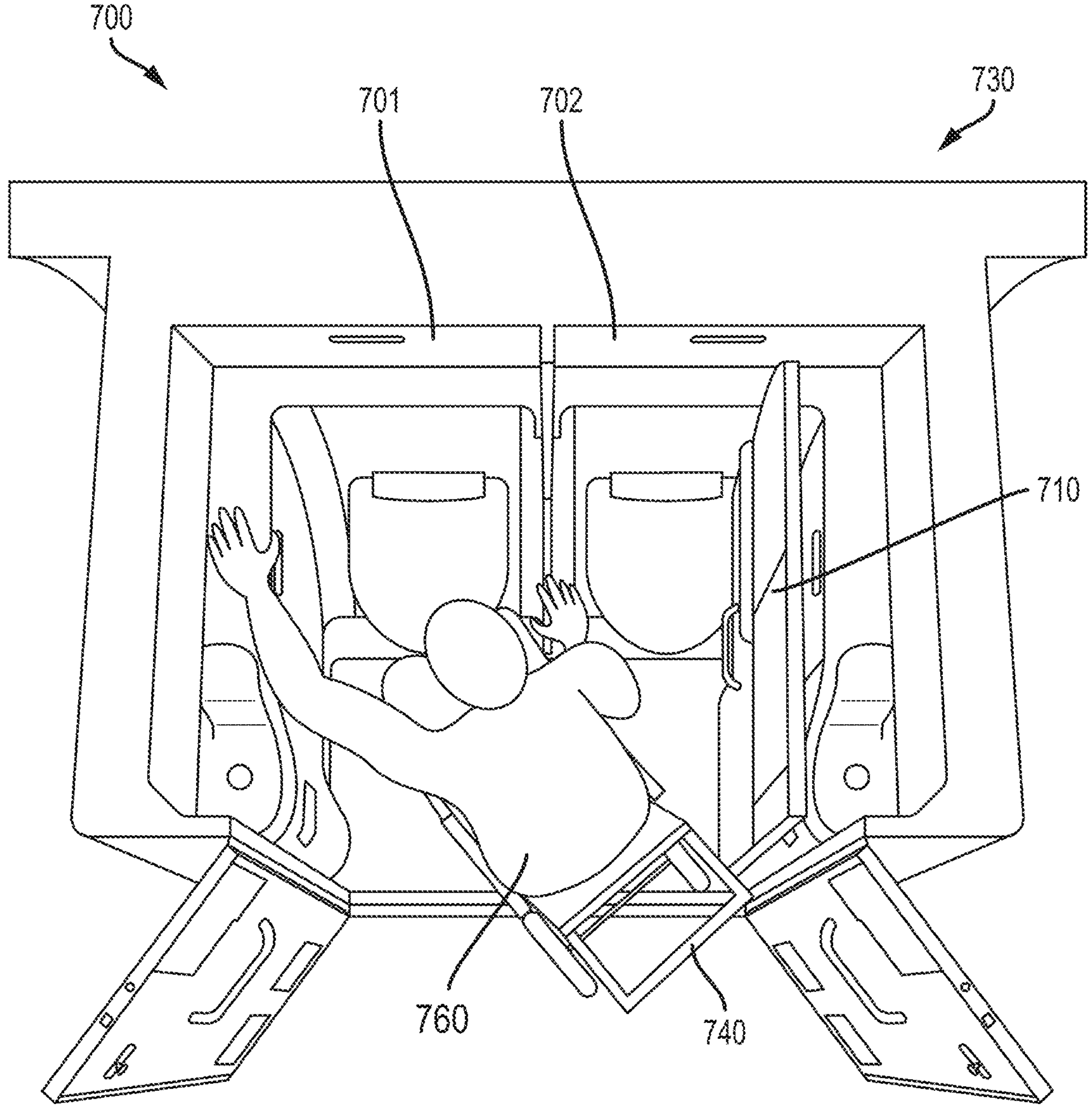
FIG. 7 illustrates an occupant of adaptable lavatory, in accordance with various embodiments.

With reference to FIG. 7, an adaptable lavatory 700 is illustrated. Adaptable lavatory 700 may be similar to adaptable lavatories 500, 600. In various embodiments, adaptable lavatory 700 comprises first single lavatory 701 and a second single lavatory 702. In various embodiments, adaptable lavatory 700 comprises a lavatory wall system 730, which may be similar to lavatory wall systems 300, 400. In various embodiments, adaptable lavatory 700 comprises a center wall 710. Center wall 710 may be secured in a single lavatory configuration such that an occupant 760 may enter adaptable lavatory 700 with a mobility device such as wheelchair 740 with additional space and ease as compared to a standard single lavatory.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the specification or claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but May include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A lavatory wall system, comprising:

a pair of rail tracks extending in a Y-direction;

a pair of hanging brackets each coupled to one of the pair of rail tracks via rollers disposed and configured to translate within the pair of rail tracks;

a center wall coupled to the pair of hanging brackets and configured to translate with the rollers; and an anti-rack device fixedly coupled to and extending between each of the hanging brackets in an X-direction such that the center wall remains perpendicular to each of the rail tracks in an X-Y plane, wherein the pair of hanging brackets is coupled to the center wall by bracket panels and each of the hanging brackets of the pair of hanging brackets further comprises a pivot point disposed between the rollers and the bracket panels, the pivot point allowing the bracket panels to rotate about an X-axis with respect to the pair of rail tracks.

2. The lavatory wall system of claim 1, wherein the center wall has a curved segment abutting a cutout and a flat segment opposing the curved segment and perpendicular to the pair of rail tracks.

3. The lavatory wall system of claim 1, wherein the anti-rack device is coupled to a pair of dampening mechanisms configured to limit the rotation of the pivot points to 20°.

4. The lavatory wall system of claim 3, further comprising a drop ceiling having linear recesses configured to receive the pair of rail tracks.

5. An airplane lavatory, comprising:

a first single lavatory, a second single lavatory, a drop ceiling spanning the first single lavatory and the second single lavatory;

a pair of linear rail tracks disposed within the drop ceiling and extending linearly from a first end to a second end of the drop ceiling;

a pair of hanging brackets each coupled to one of the pair of linear rail tracks via rollers disposed and configured to translate within the one of the pair of linear rail tracks; and a center wall coupled to the hanging brackets and configured to translate with the rollers, wherein the pair of linear rail tracks extend in an X-Y plane, wherein the pair of hanging brackets is coupled to the center wall by bracket panels and each hanging bracket of the pair of hanging brackets further comprises a pivot point disposed between the rollers and the bracket panels, the pivot point allowing the bracket panels to rotate about an X-axis with respect to the pair of linear rail tracks.

6. The airplane lavatory of claim 5, wherein each hanging bracket further comprises a dampening mechanism configured to limit the rotation of the pivot point to 20°.

7. The airplane lavatory of claim 5, wherein the drop ceiling has linear recesses configured to receive the pair of linear rail tracks.

8. The airplane lavatory of claim 5, wherein the center wall has at least one lock configured to prevent the center wall from translating within the pair of linear rail tracks.

9. The airplane lavatory of claim 8, wherein in response to being in a dual lavatory configuration, the center wall is secured by the at least one lock in a center of the first single lavatory and the second single lavatory.

10. The airplane lavatory of claim 9, wherein in response to being in a single lavatory configuration, the center wall is translated along the pair of linear rail tracks and secured by the at least one lock within at least one of the first single lavatory or the second single lavatory.

11. The airplane lavatory of claim 10, wherein the center wall has a rear wall defined by a curved segment and a cutout.

12. The airplane lavatory of claim 11, wherein the cutout is configured to accommodate a toilet of at least one of the first single lavatory and the second single lavatory in response to the translation of the center wall.

13. An aircraft, comprising:

an adaptable lavatory including:

a first single lavatory, a second single lavatory, a drop ceiling spanning the first single lavatory and the second single lavatory;

a pair of linear rail tracks disposed within the drop ceiling and extending linearly between the first single lavatory and the second single lavatory;

a pair of hanging brackets each coupled to one of the pair of linear rail tracks via rollers disposed and configured to translate within the pair of linear rail tracks; and a center wall coupled to the hanging brackets and configured to translate with the rollers, wherein the pair of linear rail tracks extend in an X-Y plane, wherein the pair of hanging brackets is coupled to the center wall by bracket panels and each hanging bracket of the pair of hanging brackets further comprises a pivot point disposed between the rollers and the bracket panels, the pivot point allowing the bracket panels to rotate about an X-axis with respect to the pair of linear rail tracks, wherein the hanging brackets further comprise a dampening mechanism configured to limit the rotation of the pivot point to 20°.

14. The aircraft of claim 13, wherein the center wall has at least one lock configured to prevent the center wall from translating with respect to the pair of linear rail tracks.

15. The aircraft of claim 14, wherein in response to being in a dual lavatory configuration, the center wall is secured by the at least one lock in a center of the first single lavatory and the second single lavatory.

16. The aircraft of claim 15, wherein in response to being in a single lavatory configuration, the center wall is translated along the pair of linear rail tracks and secured by the at least one lock within at least one of the first single lavatory or the second single lavatory.

17. The aircraft of claim 16, wherein the center wall has a rear wall defined by a curved segment and a cutout, wherein the cutout is configured to accommodate a toilet of at least one of the first single lavatory and the second single lavatory in response to the translation of the center wall.

* * * * *